(12) United States Patent
An et al.

(10) Patent No.: US 6,981,266 B1
(45) Date of Patent: Dec. 27, 2005

(54) NETWORK MANAGEMENT SYSTEM AND METHOD

(75) Inventors: Sunshin An, Seoul (KR); Dongjin Han, Seoul (KR); Wenzhe Cui, Seoul (KR); Youngeun Park, Seoul (KR); Shinhyuk Kang, Seoul (KR); Soo Hyun Park, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/395,207

(22) Filed: Sep. 14, 1999

(30) Foreign Application Priority Data

Oct. 17, 1998 (KR) .................................. 98-43778

(51) Int. Cl.[7] ............................................. G06F 3/00
(52) U.S. Cl. ................ 719/316; 719/315; 719/317; 709/202; 709/223; 717/108; 717/116
(58) Field of Search ............................. 709/223, 315, 709/316, 317, 246, 202; 719/315, 316, 317; 707/10, 100; 345/853; 379/230; 713/2; 717/108

(56) References Cited

U.S. PATENT DOCUMENTS

| | | | |
|---|---|---|---|
| 5,475,838 A * | 12/1995 | Fehskens et al. | |
| 5,574,898 A | 11/1996 | Leblang et al. | |
| 5,659,736 A * | 8/1997 | Hasegawa et al. | 707/100 |
| 5,815,415 A * | 9/1998 | Bentley et al. | |
| 5,832,224 A * | 11/1998 | Fehskens et al. | |
| 5,864,862 A | 1/1999 | Kriens et al. | |
| 5,987,242 A * | 11/1999 | Bentley et al. | |
| 5,987,463 A * | 11/1999 | Draaijer et al. | 707/10 |
| 6,134,581 A * | 10/2000 | Ismael et al. | 709/202 |
| 6,208,345 B1 * | 3/2001 | Sheard et al. | |
| 6,212,574 B1 * | 4/2001 | O'Rourke et al. | |
| 6,243,457 B1 | 6/2001 | Lin et al. | |
| 6,324,576 B1 * | 11/2001 | Newcombe et al. | |
| 6,356,955 B1 * | 3/2002 | Hollberg et al. | 719/315 |
| 6,401,117 B1 * | 6/2002 | Narad et al. | |
| 6,427,230 B1 * | 7/2002 | Goiffon et al. | 717/108 |
| 6,636,964 B1 * | 10/2003 | Okamura | 713/2 |

OTHER PUBLICATIONS

Yata et al., "ATM Transport Network Operation System Based on Object Oriented Technologies", NTT Transmission Systems Laboratories, 1994, IEEE, p. 838-842.*

* cited by examiner

Primary Examiner—Saleh Najjar
Assistant Examiner—Michael Won
(74) Attorney, Agent, or Firm—Fleshner & Kim, LLP

(57) ABSTRACT

A network management system and method is disclosed that can add or modify, for example, a managed object, without recompiling or stopping operations of an executing network management system. Thus, preferred embodiments of the present invention allow a dynamic management of managed objects in a network management system.

14 Claims, 3 Drawing Sheets

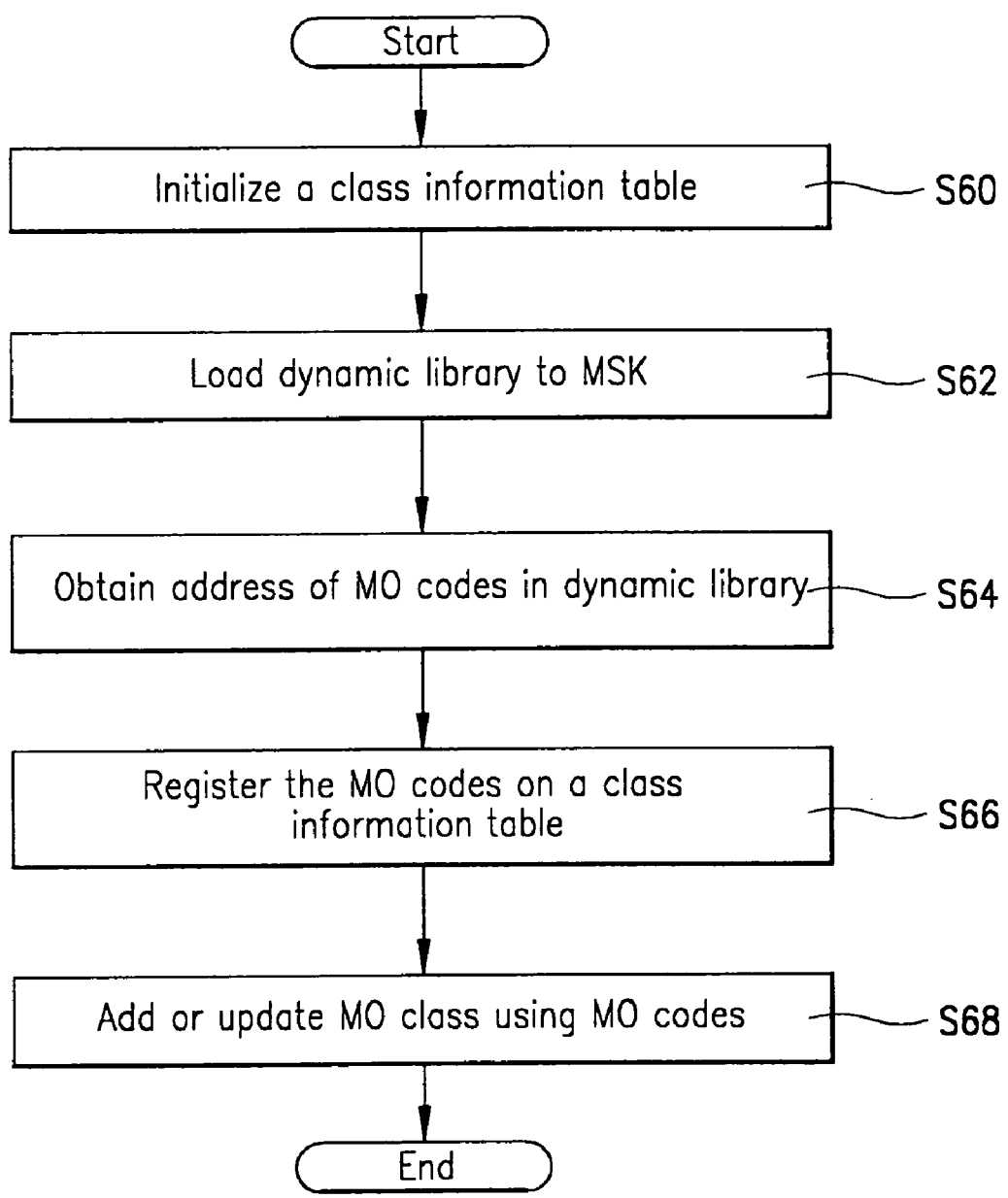

NETWORK MANAGEMENT SYSTEM AND METHOD

BACKGROUND OF THE INVENTION

1. Field of the Invention

The present invention relates to a network management system, and more particularly to a network management system and method of a Telecommunication Management Network.

2. Background of the Related Art

Due to a rapid development of the information and communication technology, the current trend for businesses is to connect and freely share data with other communication networks. However, even for businesses established in the same region, the network management platforms vary in both organization and communication method depending upon the company and standards established. Therefore, a global network management system that can effectively and cooperatively manage the different communication networks is required.

One such network management system is a Telecommunication Management Network (TMN) recommended by the ITU-T(CCITT). The TMN type network management system allows a unified management of all types of communication networks by providing a standardized interface for exchanging management information between communication devices in networks of various operation systems. More specifically, the TMN system utilizes an object-oriented information modeling technique and manager/agent concepts which underlying the Open System Interconnection (OSI) system management.

In the OSI system management, a system manager and an agent model are utilized such that the agent can manage objects. A managed object (MO) is generally an OSI abstract view of a logical or physical system resource to be managed. A MO class defines attributes of an object and a particular set of attribute is a MO instance. The MO instances have many relationships, of which the containment relationship is the primary relationship. Accordingly, the agent maintains a containment tree to express the containment relationships of the MO class instances.

Thus, the containment tree is a starting point of the agent's management operation as well as the core of MO management. The agent executes scoping of a priority containment tree in response to a management request from the manager. The scoping performed by the agent entails selecting scopes of the MO instances to be managed and carrying out the necessary management operation on the selected MO instance. The agent may also perform filtering by which a determination is made whether the management operations should be performed on the scoped MO.

In the TMN managed system, all MO instances are administered in a Management Information Tree (MIT) based on the containment relationship. The containment relationship allows one MO instance to contain one or more other MO instances, and a containing MO instance can be contained in other MO instances. Each MO instance can be identified with a unique name based on the containment relationship. A management operation can be requested on one or more MO instances by a managing system specifying the scope and filter parameters in the management operation primitives.

The network management applications that administer the network resources are developed based upon a network management platform. In general, network management platforms provide both run-time and development environments. The run-time environment is represented by common management services, which reflect the overall operability of a management platform. On the other hand, the development environment provides the portability for management applications and allows the integration of these applications into the platform services. The performance of a network management system relies upon the performance of the network management platform used.

During the process of performing management operations in a managed system, all executed codes are provided by a network management platform with the exception of user codes. The user codes can be added to satisfy a management system developer's requirements, e.g. interactions with real resource. In the TMN based network management system, management states and resources of network elements are modeled into MOs according to the Guidelines for the Definition of Managed Object (GDMO), and the management operation is requested from the manager based on Common Management Information Protocol (CMIP).

A MO code is generated when a GDMO file described by a user is processed through a GDMO compiler. Thereafter, the user adds a further code to the MO code. The MO code and a predetermined management operation code together with the network system are compiled to generate an executable network management system program. When the program is executed, the network management system enters a standby mode until a management command is received from the manager.

If a management command, such as 'create,' 'get,' 'cancel-get,' 'delete,' is received, the network management system executes a management operation on the designated MO. For example, if a management command is 'create,' the network management system executes a MO generating routine to create a new MO. For other management commands, the network management system executes a management operation on a MO selected from the containment tree. Upon completion of the management operation, the network management system returns the result to the manager and re-enters a standby mode.

When an operation of the network management system is not required, the execution of the network management system is also stopped. However, even when an element of the network management system needs to be modified, the execution of the network management system is also stopped. Namely, the network management system cannot dynamically manage the MO class. Accordingly, when a new MO class needs to be added or a MO class already in the network management system is to be modified, the MO class must be compiled in advance in the network management system prior to the execution of the management system. Therefore, to add a new MO class or to modify a MO class in the network management system, the on-going network management system must be stopped before a MO can be added or modified, and re-executed after the addition or modification.

As described above, the related art network management system has various disadvantages. To add a new MO class or to modify a MO class in the network management system, the on-going network management system must be stopped before a MO can be added or modified, and re-executed after the addition or modification. However, the process of stopping in the middle of operation and re-execution may take hours or even days depending upon the addition or modification. As numerous users utilize a network management system, stopping the network management system for even a short period of time is a fatal defect or a significant disadvantage to the network management system and users, and thereby the communication service.

To alleviate the impact, the network management system is stopped to add or modify a MO class when it is determined that there are relatively few users in the network system. Nevertheless, the network management system is still static and cannot dynamically support additions of new MOs or modification of MOs already in the network management system during the middle of the network management system operation.

The above references are incorporated by reference herein where appropriate for appropriate teachings of additional or alternative details, features and/or technical background.

SUMMARY OF THE INVENTION

An object of the present invention is to provide a network management system that obviates at least one of the problems caused by disadvantages of the related art.

Another object of the present invention is to provide a network management system and method that allows dynamic loading of a new MO class on a network management system.

Another object of the present invention is to provide a network management system and method that allows dynamic loading of a new MO class on a network management system in the middle of the network management system operation.

To achieve at least the above objects in a whole or in parts and in accordance with the purposes of the invention, as embodied and broadly described herein, the network management system includes a management system kernel (MSK) providing a managing systems with run-time environment; and a managed object generation environment (MOGE) loading at least one class. The present invention includes running the MSK, loading a MO dynamic library from the MOGE utilizing a dynamic class loading routine stored in the MSK, and executing the MO dynamic library. In particular, the MO dynamic library is loaded to the MSK during operation. i.e. while the MSK is running.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a flow chart showing a procedure for dynamic class loading shown in FIG. 2.

DETAILED DESCRIPTION OF PREFERRED EMBODIMENTS

In general, a management system has two major functions: a platform core functionality and an application dependant functionality. In a platform according to preferred embodiments of the present invention, the platform core functionality is implemented in a Management System Kernel (MSK) and the application dependent functionality is implemented based on a Managed Object Generation Environment (MOGE). The management applications developed based on the same management platform are provided with the same platform core functionality, but the application dependent functionality varies in different management applications according to the definition and the behavior of MO classes defined by the developer.

In the management platforms of the related art, the platform core functionality and the application dependent functionality must be compiled together before running the management application, as discussed above. However, according to the preferred embodiments of the present invention, a dynamic class loading mechanism is used. The dynamic class loading mechanism is preferably implemented based on a shared library. By use of the dynamic class loading mechanism, the application dependent functionality is completely separated from the platform core functionality. A shared library in accordance with the present invention can be similar to a shared library in a Unix system. The platform core functionality is preferably compiled into a separate executable module, which runs alone as a process when a management application starts. The application dependent functionality, i.e., MO classes defined by a developer, is preferably compiled into the shared libraries. The shared libraries and a external meta file (EMM) are loaded together into the management application in run time without shutting down the management application.

When an instance of an MO class is required to be created by a CMIP request or a local requirement according to the preferred embodiments, the MSK first checks whether the MO class exists in the management system kernel. If the MO class does not exist, the MSK will read a special file to check whether the shared library of the required MO class exists. If the MO class can be found, the class will be loaded, otherwise "no such class" error returns.

Figure 1:
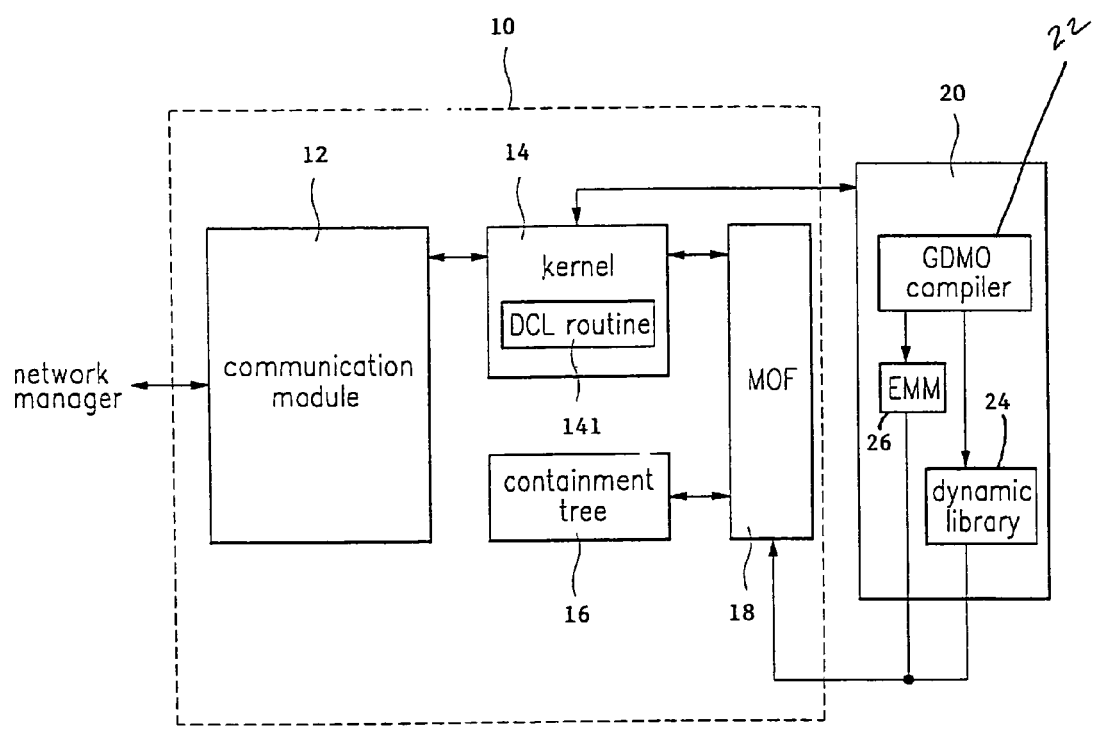
FIG. 1 is a block diagram of a network management system in accordance with a preferred embodiment of the present invention.

FIG. 1 is a block diagram showing a first preferred embodiment of a network management system (NMS) in accordance with the present invention including a MSK 10 providing management systems with a run-time environment, and a MOGE 20 providing a development environment for management applications. As shown in FIG. 1, the MSK 10 includes a communication module 12, a kernel 14 with a dynamic class loading (DCL) routine 141, a containment tree 16, and a management object framework (MOF) 18. The MOGE 20 includes a GDMO compiler 22 and a dynamic library 24 and preferably an EMM file.

The communication module 12 communicates with a network manager and provides management applications with communications services. The kernel 14 preferably runs in the form of a thread and is responsible for initializing a managed system, establishing an association with other management systems, performing management operations and updating new MO information without recompiling or restarting the managed system. The kernel 14 can create a dedicated agent in the form of a thread to provide a specified management system with management services. The full set of MO instances available across a management interface is organized into a tree structure in the containment tree 16. When an operation is performed in a managed system, all MO instances are accessed through the containment tree 16. The MOF 18 maintains the information on all MO classes. Thus, the MO class information is preferably completely separated from the MO instance implementation.

Utilizing the GDMO compiler 22, the class information is generated from GDMO scripts and stored in specific files called External Meta file (EMM) 26. The EMM 26 is a special set of files including several files where each file contains information of MO class elements. When the GDMO compiler 22 compiles a GDMO script defined by a developer, the EMM 26 files are generated with MO class codes. According to the first preferred embodiment of the NMS, the EMM 26 includes two parts: one part reflects the MO class definition described in a GDMO script, and the other part identifies the location and the name of dynamic libraries of MO classes.

Accordingly, the GDMO compiler 22 is a critical component of the management platform. The output of GDMO compiler 22 includes MO class codes, preferably in C++, and the EMM 26. The MO class codes are compiled into the dynamic library 24 preferably in a form of a dynamic link library by using an appropriate compiler, and the EMM 26 is used to initialize and update the MOF when the MO classes are added into a network management system. Namely, after a managed system starts, if a newly-made MO class or an existing MO class is to be updated to an operating managed system, the kernel 14 generates or updates the MOF 18 based on the EMM 26. Thus, the EMM 26 is used to construct the MOF when initiating a managed system or performing the dynamic class loading. This enables management system developers to manipulate MO class information easily and efficiently.

Figure 2:
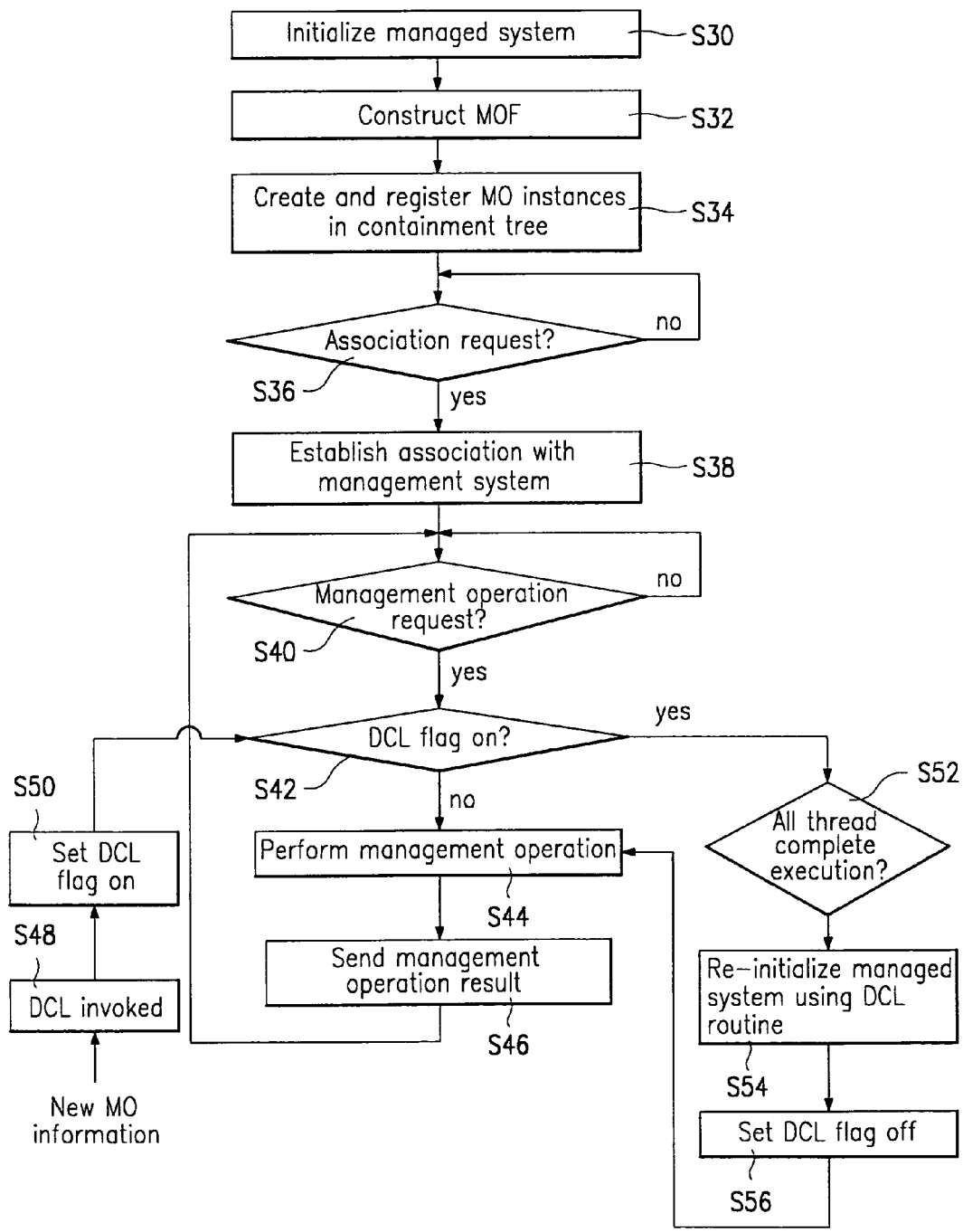
FIG. 2 is a flow chart showing a preferred embodiment of a class dynamic loading procedure in a network management system in accordance with the present invention.

FIG. 2 is a flow chart showing a second preferred embodiment of a method of operating a network management system according to the present invention. At step S30, first the kernel 14 initializes a managed system, and at step S32, the kernel 14 constructs a MOF 18 containing information of all MO classes from EMM 26. The kernel 14 then creates MO instances at step S34 indicated in persistent device or initial MO files, and registers the MO instances in the containment tree 16 according to the MO class information in the MOF 18. After the initialization, at step S36 if an association request is received from a management system, the kernel 14 establishes an association with the management system requesting the association at step S38.

Upon establishing an association with management systems in step S38, the kernel 14 performs a management operation requested from management applications. In particular, the kernel 14 preferably waits for such management operation requests from a management system at step S40. When the management operation request arrives, the kernel 14 checks whether the DCL flag is on at step S42. If the DCL flag has not been set on at step S42, the kernel 14 performs the requested management operation at step S44. Then at step S46, the kernel 14 sends a management operation result to the management system that requested the management operation. In addition, the kernel 14 may also maintain the association for later management operation requests.

After sending the management operation result, the kernel 14 returns to step S40 and waits again for another management operation request. However, the kernel 14 may perform management operations on several MOs by creating dedicated agents after storing the information about the management system. In such cases, the kernel 14 checks whether an additional thread can be created. If an additional thread can be created, the kernel 14 creates a dedicated agent to take charge of subsequent management operations from the management system. After creation, the dedicated agent thread is executed and the kernel 14 delivers the association information to the dedicated agent and the information is used in interacting with the management system. Upon delivering the association information, the kernel 14 can return to step S40 and wait for additional management operation requests.

To add or modify a MO class, at step S48 a management system invokes the DCL function by sending a control signal. When the control signal is received, the kernel 14 sets the DCL flag on at step S50. Thus, when the DCL flag is on at step S42, the kernel 14 waits for all present threads to complete execution at step S52. If dedicated agents were created, the kernel 14 would wait for the completion of all dedicated agent threads. At step S54, when all threads exit, the kernel 14 re-initializes the managed system utilizing the DCL routine. Namely, the dynamic library 24 is preferably loaded on the MOF 18. Thereafter, the kernel 14 resets the DCL flag to an off status at step S56 and continues flow of the managed system.

Processes for executing the DCL routine will be further described with reference to FIG. 3. First, EMM 26 file stored in the MOGE 20 is opened at step S60 and a class information table in the MOF 18 is initialized according to EMM 26 file. At step S62 the dynamic library indicated by EMM 26 file is then loaded on the MSK 10. In particular, an address of MO class codes in the dynamic library 24 is obtained using the EMM file at step S64. The MO class code is then registered on the class information table in the MOF 18 at step S66. Then, a MO class in the MOF is added or updated using the MO class codes from the dynamic library at step S68. If an addition or modification of a MO class is not needed, the loaded MO class is preferably utilized without invoking the DCL routine.

As described above, the preferred embodiments of a network management system and method of the present invention have various advantages. The preferred embodiments allow a dynamic addition or modification of MO information to the network management system without stopping the operation of a running network management system. Although a DCL flag is utilized in the above embodiment, any other method may be utilized to load the dynamic library on the MOF to add or modify MO information to a running network management system. Thus, the preferred embodiments of a NMS and method according to the present invention permit continuous expansion and improvement of the network management system as well as an effective management of the whole network, thereby significantly increasing the overall communication service quality.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A network management system, comprising:
    a management system kernel that provides management systems with a run-time environment;
    a managed object generation environment separately operable from the management system kernel and that provides a development environment for managing applications, wherein the management system kernel dynamically adds or dynamically modifies managed object (MO) information based upon an external meta file (EMM) from the managed object generation environment without interrupting an operation of the network management system; and a dynamic library in the managed object generation environment that stores the MO information to be modified, wherein the EMM includes an address and name of the dynamic link library corresponding to the MO information to be modified, wherein the MO information is modified in the management system kernel according to said address, and wherein the MO information is transferred from the dynamic link library to a management object framework only when all executing threads have been executed.

2. The system of claim 1, wherein the management system kernel comprises:

a communication module that provides communication with a network manager;

a managed object framework that maintains information on MO classes;

a kernel that stores a dynamic class loading module and initializes the network management system, wherein said kernel establishes an association with other management systems through the communication module, performs management operations on MOs, adds the MO information in the managed object framework using the dynamic class loading module and modifies the MO information in the managed object framework using the dynamic class loading module; and a containment tree that organizes MO instances according to the information on MO classes and allows access to the MO instances when a management operation is performed in the network managed system.

3. The system of claim 2, wherein the managed object framework maintains information on MO classes by registering MO class codes on a class information table.

4. The system of claim 2, wherein the kernel creates at least one dedicated agent to perform subsequent management operations from management systems with which an association has been established.

5. The system of claim 1, wherein the managed object generation environment comprises:

a MO compiler that compiles a MO script to generate the EMM file and MO class codes; and the dynamic library storing the MO class codes.

6. The system of claim 5, wherein the EMM file includes MO class definition described in the MO script, and identifies a location and name in the dynamic library of a corresponding MO class.

7. The system of claim 5, wherein the MO class codes are compiled and stored in the dynamic library in a form of a dynamic link library.

8. A network management method comprising:

(a) storing a dynamic class loading routine in a management system kernel;

(b) initializing a managed system by constructing a managed object framework of the management system kernel that contains information of managed object (MO) classes;

(c) creating MO instances and registering the MO instances in a containment tree of the management system kernel according to the information of MO classes;

(d) checking whether a dynamic class loading flag is on when receiving a management operation request from a management system; and (e) updating MO information on the management system kernel without interrupting an operation of the management system by, waiting for all threads to complete execution, loading a dynamic library to the managed object framework utilizing the dynamic class loading routine when the dynamic class loading flag is on, opening an EMM file stored outside the management system kernel, and resetting the dynamic class loading flag to off, wherein the MO information to be modified is stored in the managed object generation environment in the dynamic link library, wherein the EMM includes an address and name of the dynamic link library corresponding to the MO information to be modified, wherein the MO information is modified in the management system kernel according to said address, and wherein the MO information is transferred from the dynamic link library to the management object framework only when all executing threads have been executed.

9. The method of claim 8, further comprising:

(f) performing the requested management operation and sending a management operation result to the management system requesting the management operation when the dynamic class loading flag is not on.

10. The method of claim 8, further comprising storing information about the management system requesting a management operation.

11. The method of claim 8, further comprising:

checking whether an additional thread can be created;

creating a dedicated agent to take charge of subsequent management operations from the management system requesting an association if an additional thread can be created; and executing the dedicated agent thread and delivering association and management operation information to the dedicated agent to be utilized in interacting with the management system.

12. The method of claim 8, wherein the dynamic class loading flag is set on when the management system requesting a management operation invokes the dynamic class loading function to perform one of adding and modifying MO information in the management system kernel.

13. The method of claim 12, wherein the management system requesting the management operation invokes the dynamic class loading function by sending a control signal.

14. A network management method, comprising:

storing a dynamic class loading routine in a management system kernel of the managed system;

updating the management system kernel by modifying managed object (MO) information in the management system kernel while the managed system is operating by utilizing the dynamic class loading routine; and generating the MO information to be modified and generating an external meta file (EMM) in a managed object generation environment of the managed system wherein the dynamic class loading routine opens the EMM file to modify the MO information in the management system kernel,
wherein the MO information to be modified is stored in the managed object generation environment in the form of a dynamic link library,
wherein the EMM indicates an address and name of the dynamic link library corresponding to the MO information to be modified,
wherein the MO information is modified in the management system kernel according to said address, and
wherein the MO information is transferred from the dynamic link library to a management object framework only when all executing threads have been executed.

* * * * *